United States Patent
Ko et al.

(10) Patent No.: US 10,003,470 B2
(45) Date of Patent: Jun. 19, 2018

(54) METHOD AND TERMINAL FOR TRANSMITTING AND RECEIVING DATA

(71) Applicant: SAMSUNG ELECTRONICS CO., LTD., Suwon-si (KR)

(72) Inventors: Hyeon-mok Ko, Hwaseong-si (KR); Dae-hyung Kwon, Seoul (KR); Kill-yeon Kim, Suwon-si (KR); Duk-gu Sung, Seoul (KR); Mun-hwan Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 92 days.

(21) Appl. No.: 15/140,999

(22) Filed: Apr. 28, 2016

(65) Prior Publication Data

US 2016/0323117 A1 Nov. 3, 2016

(30) Foreign Application Priority Data

Apr. 28, 2015 (KR) ........................ 10-2015-0060047

(51) Int. Cl.
| | |
|---|---|
| *G01R 31/08* | (2006.01) |
| *H04L 12/18* | (2006.01) |
| *H04W 4/00* | (2018.01) |
| *H04W 88/02* | (2009.01) |
| *H04L 12/26* | (2006.01) |

(52) U.S. Cl.
CPC ............ *H04L 12/189* (2013.01); *H04L 43/10* (2013.01); *H04W 4/005* (2013.01); *H04L 43/0829* (2013.01); *H04L 43/0864* (2013.01); *H04L 43/0894* (2013.01); *H04W 88/02* (2013.01)

(58) Field of Classification Search
CPC ... H04L 12/189; H04L 43/10; H04L 43/0894; H04L 43/0864; H04L 43/0829
See application file for complete search history.

(56) References Cited

U.S. PATENT DOCUMENTS

| | | | | |
|---|---|---|---|---|
| 6,160,544 A | * | 12/2000 | Hayashi | H04H 40/18 348/E5.022 |
| 6,925,502 B1 | * | 8/2005 | Abbasi | H04L 47/10 370/231 |
| 7,813,324 B1 | * | 10/2010 | Goel | H04L 1/004 370/336 |
| 8,453,029 B2 | * | 5/2013 | Dinan | H04L 1/1812 370/278 |
| 2003/0031198 A1 | * | 2/2003 | Currivan | H03M 13/2707 370/465 |
| 2006/0198325 A1 | * | 9/2006 | Gao | H04L 1/0057 370/270 |
| 2008/0056255 A1 | * | 3/2008 | Birman | H04L 12/1868 370/390 |

(Continued)

*Primary Examiner* — Robert Wilson
(74) *Attorney, Agent, or Firm* — Sughrue Mion, PLLC

(57) ABSTRACT

A method for transmitting and receiving data, which is performed by a terminal, includes: transmitting first data to each of a plurality of reception terminals connected to the terminal, the first data including a source data segment and a parity data segment; determining second data to be transmitted after the first data, based on feedback information that relates to the first data and is received from each of the plurality of reception terminals; and transmitting the determined second data to each of the plurality of reception terminals.

20 Claims, 16 Drawing Sheets

(56) References Cited

U.S. PATENT DOCUMENTS

| | | | |
|---|---|---|---|
| 2008/0126562 A1* | 5/2008 | Ludwig | H04L 1/1858 709/235 |
| 2010/0153807 A1 | 6/2010 | Kakani | |
| 2010/0332936 A1* | 12/2010 | Ji | H04L 1/1822 714/748 |
| 2012/0188934 A1* | 7/2012 | Liu | H04L 12/1863 370/312 |
| 2014/0119268 A1 | 5/2014 | Chu et al. | |
| 2014/0192691 A1 | 7/2014 | Vyas et al. | |
| 2015/0092652 A1 | 4/2015 | Ramamurthy et al. | |
| 2016/0323117 A1* | 11/2016 | Ko | H04L 12/189 |

* cited by examiner

METHOD AND TERMINAL FOR TRANSMITTING AND RECEIVING DATA

CROSS-REFERENCE TO RELATED APPLICATION

This application claims priority from Korean Patent Application No. 10-2015-0060047, filed on Apr. 28, 2015 in the Korean Intellectual Property Office, the disclosure of which is incorporated herein by reference in its entirety.

BACKGROUND

1. Field

Exemplary embodiments relate to a method for transmitting and receiving data in a transmission terminal, a method for transmitting and receiving data in a reception terminal, a transmission terminal for transmitting and receiving data, a reception terminal for transmitting and receiving data, and a non-transitory computer-readable recording medium storing thereon a program for performing the methods for transmitting and receiving data.

2. Description of the Related Art

The Internet has evolved from a human-centered connection network, through which a human generates and consumes information, to an Internet of Things (IoT) network that receives, transmits, and processes information between distributed elements such as objects. Further, Internet of Everything (IoE) technology has emerged, which combines a data processing technology with an IoT technology via a connection to a cloud server or the like. In order to implement the IoT, technical components, such as sensing technologies, wired/wireless communication and network infrastructures, service interface technologies, and security technologies, are required. Accordingly, research has recently been conducted into technologies for connection between objects, such as sensor networks, machine to machine (M2M), and machine type communication (MTC).

In an IoT environment, it is possible to provide an intelligent Internet technology (IT) service that gathers and analyzes data generated by connected objects and creates a new value for a human life. The IoT may be applicable to various fields, such as smart home, smart building, smart city, smart car or connected car, smart grid, health care, smart appliance, or advanced medical care services, through convergence and fusion with various industries.

SUMMARY

According to one or more exemplary embodiments, when data is transmitted and received between a plurality of terminals, resources necessary for transmission and reception of data may be utilized more efficiently by controlling data that is transmitted from a transmission terminal to a reception terminal.

Additional aspects will be set forth in part in the description which follows and, in part, will be apparent from the description, or may be learned by practice of the presented exemplary embodiments.

According to an aspect of an exemplary embodiment, there is provided a method for transmitting and receiving data, which is performable by a transmission terminal, the method including: transmitting first data to each of a plurality of reception terminals that are connected to the transmission terminal, the first data including a source data segment and a parity data segment; determining second data to be transmitted after the first data has been transmitted, based on feedback information that relates to the first data that is received from each of the plurality of reception terminals; and transmitting the determined second data to each of the plurality of reception terminals.

According to another aspect of an exemplary embodiment, there is provided a terminal, including: a transmitter configured to transmit first data to each of a plurality of destination terminals that are connected to the terminal via a network, the first data including at least one source data segment and at least one parity data segment; a receiver configured to receive, from each of the plurality of destination terminals, feedback information that relates to the first data; and a controller configured to determine, based on the received feedback information, second data to be transmitted after the first data has been transmitted, and to control the transmitter to transmit the determined second data to each of the plurality of destination terminals.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
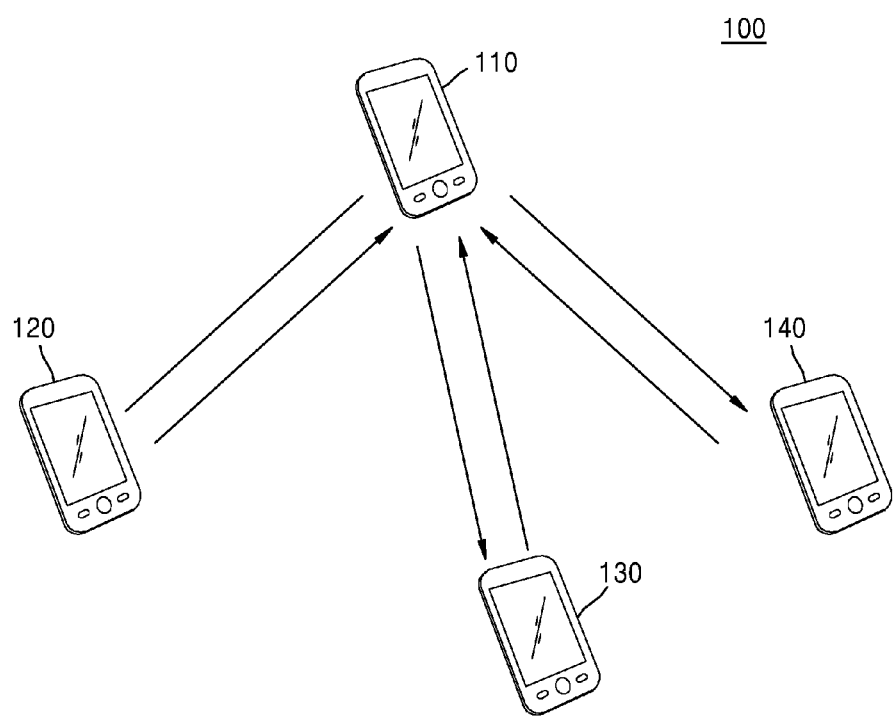
FIG. 1 is a diagram for describing a system for transmitting and receiving data, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

The terms used herein are those general terms currently widely used in the art in consideration of functions in regard to the exemplary embodiments, but the terms may vary according to the intention of those of ordinary skill in the art, precedents, or new technology in the art. In addition, specified terms may be selected by the applicant, and in this case, the detailed meaning thereof will be described in the detailed description of the exemplary embodiments. Thus, the terms used herein should be understood not as simple names but based on the meaning of the terms and the overall description of the exemplary embodiments.

It will also be understood that the terms "comprises", "includes", and "has", when used herein, specify the presence of stated elements, but do not preclude the presence or addition of other elements, unless otherwise defined. Also, the terms "unit" and "module" used herein represent a unit for processing at least one function or operation, which may be implemented by hardware, software, or a combination of hardware and software.

The exemplary embodiments will be described with reference to the accompanying drawings in such a manner that the exemplary embodiments may be easily carried out by those of ordinary skill in the art. However, the present inventive concept may be implemented in various forms and is not limited to the exemplary embodiments. For clarity with respect to the exemplary embodiments, parts having no relation to descriptions are omitted and like reference numerals are assigned to like elements throughout the specification and drawings.

FIG. 1 is a diagram for describing a system 100 for transmitting and receiving data, according to an exemplary embodiment.

The system 100 according to the present exemplary embodiment may include a transmission terminal 110 and a plurality of reception terminals 120, 130, and 140. It will be understood by those of ordinary skill in the art that each of the terms "transmission terminal" and "reception terminal" refers to a terminal that is capable of performing both transmission of signals and reception of signals.

Only elements associated with the system 100 are illustrated in FIG. 1. Therefore, it will be understood by those of ordinary skill in the art that the system 100 may further include general-purpose elements, in addition to the elements illustrated in FIG. 1.

The transmission terminal 110 and the plurality of reception terminals 120, 130, and 140 may constitute an ad-hoc network. Referring to FIG. 1, the transmission terminal 110 and the plurality of reception terminals 120, 130, and 140 may constitute a single hop ad-hoc network, but this is merely an example. The method of transmitting and receiving data, according to the present exemplary embodiment, may also be applied to a multi-hop ad-hoc network in which a relay device (not illustrated) is connected between the transmission terminal 110 and at least one reception terminal (for example, 120).

The transmission terminal 110 may transmit data to each of the plurality of reception terminals 120, 130, and 140 by using a multicast scheme. The data may include a source data segment and a parity data segment which includes restoration information that relates to source data. A segment is a unit that represents data having a preset size. For example, the segment may include any of a data segment, a frame, or the like, but is not limited thereto.

The transmission terminal 110 according to the present exemplary embodiment may transmit first data from among acquired data to each of the plurality of reception terminals 120, 130, and 140. In addition, the transmission terminal 110 may receive feedback information that relates to the first data from each of the plurality of reception terminals 120, 130, and 140. The feedback information may include information pertaining to at least one selected from among a data loss rate, a data reception rate, and a round trip time (RTT) of the first data.

The transmission terminal 110 according to the present exemplary embodiment may predict a cause of data segment loss occurring in at least one of the reception terminals (for example, 120) based on the feedback information received from each of the plurality of reception terminals 120, 130, and 140. The cause of the data segment loss may include at least one selected from among an overflow of a buffer provided in the at least one reception terminal (for example, 120) and a channel state between the transmission terminal 110 and the at least one reception terminal (for example, 120).

The transmission terminal 110 may determine second data to be transmitted to each of the reception terminals 120, 130, and 140 after the first data has been transmitted, taking into consideration the predicted cause of the data segment loss. For example, the transmission terminal 110 may determine the number of second parity data segments for restoring second source data included in the second data. According to another exemplary embodiment, the transmission terminal 110 may determine a transmission rate of the second data.

According to another exemplary embodiment, the transmission terminal 110 may determine whether to retransmit a first parity data segment for restoring a transmitted first source data segment, based on the feedback information received from each of the plurality of reception terminals 120, 130, and 140.

The reception terminal 120 may generate the feedback information that relates to the first data. The reception terminal 120 may transmit the generated feedback information to the transmission terminal 110.

The reception terminal 120 may determine a time point at which the generated feedback information is to be transmitted to the transmission terminal 110, via the probing message received from the transmission terminal 110. The probing message may include information that relates to at least one selected from among a data loss rate, a data reception rate, and an RTT of each of the plurality of reception terminals 120, 130, and 140 connected to the transmission terminal 110. The probing message may be transmitted from the transmission terminal 110 to each of the plurality of reception terminals 120, 130, and 140 according to a preset period.

According to another exemplary embodiment, the reception terminal 120 may receive at least one segment included in the first data and at least one segment included in the second data from the transmission terminal 110. The second data represents data that is transmitted from the transmission terminal 110 after the first data has been transmitted.

Due to data loss, the reception terminal 120 may fail to restore the first source data segment from the received at least one segment of the first data. Conversely, when the reception terminal 120 cannot restore a second source data segment from the subsequently received at least one segment of the second data, the reception terminal 120 may predict a time point at which the first parity data segment of the first source data segment is to be received and determine whether to request a retransmission of the first parity data segment based on the prediction.

For example, when the reception terminal 120 predicts that the first parity data segment will not be received within a preset time, the reception terminal 120 may perform a high-level process so that the second source data segment is preferentially executed. The high-level process may include a process in an application layer or the like. According to another exemplary embodiment, when the reception terminal 120 predicts that the first parity data segment will be received within a preset time, the reception terminal 120 may send a request to the transmission terminal 110 for the first parity data segment.

The reception terminal 130 and the reception terminal 140 according to the present exemplary embodiment may operate in the same method of transmitting and receiving data as the reception terminal 120.

Figure 2:
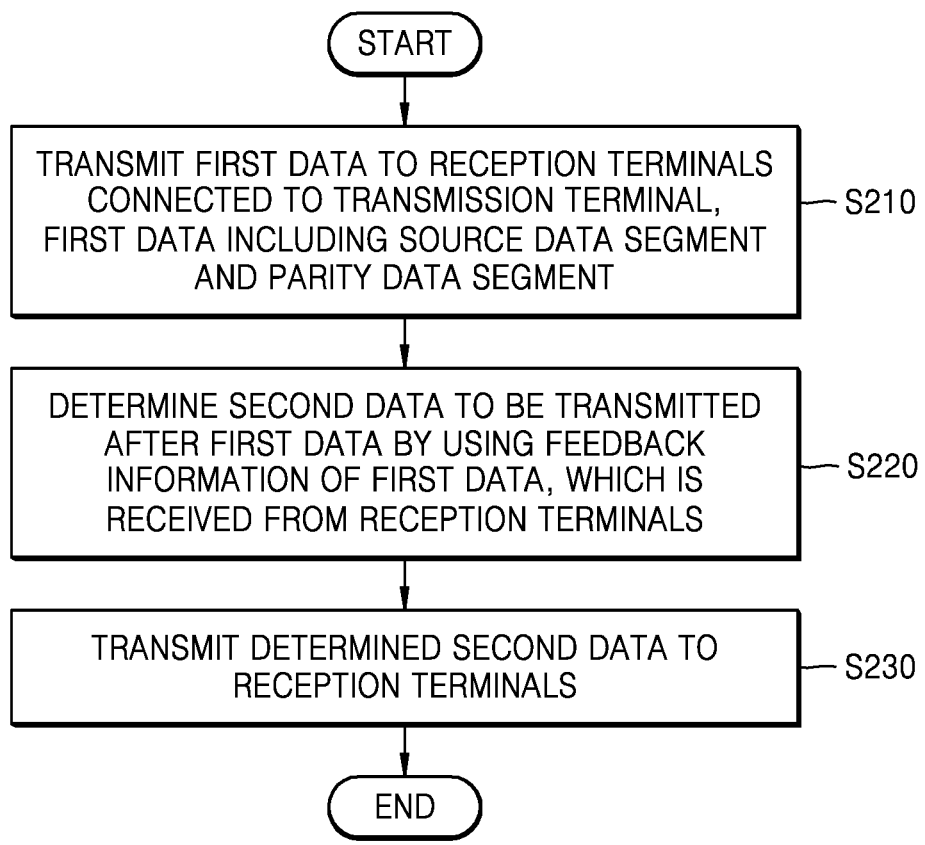
FIG. 2 is a flowchart of a method for transmitting and receiving data, which is performable by a transmission terminal, according to an exemplary embodiment.

FIG. 2 is a flowchart of a method for transmitting and receiving data, which is performable by the transmission terminal 110, according to an exemplary embodiment.

In operation S210, the transmission terminal 110 may transmit first data to each of the plurality of reception terminals 120, 130, and 140 connected to the transmission terminal 110, the first data including a source data segment and a parity data segment.

The transmission terminal 110 is a device that has a capability to process data and perform wired communication and/or wireless communication, such as, for example, any of a computer, a smart phone, and/or any other suitable device that includes a processor. The transmission terminal 110 may perform communication with each of the plurality of reception terminals 120, 130, and 140. For example, the transmission terminal 110 may constitute an ad-hoc network with the plurality of reception terminals 120, 130, and 140 and perform communication with the plurality of reception terminals 120, 130, and 140.

The transmission terminal 110 according to the present exemplary embodiment may transmit first data to each of the plurality of reception terminals 120 130, and 140 by using a multicast scheme. The multicast scheme may include a protocol that entails transmitting feedback information to the transmission terminal 110 whenever any of the plurality of reception terminals 120, 130, and 140 receives data. According to another exemplary embodiment, the multicast scheme may include a protocol that entails transmitting feedback information to the transmission terminal 110 whenever any of the plurality of reception terminals 120, 130, and 140 detects data loss. According to another exemplary embodiment, the multicast scheme may include a protocol that entails using a coding algorithm, such as forward error correction (FEC), for restoring lost data. According to another exemplary embodiment, the multicast scheme may include a combination of two or more of the above-described protocols.

In operation S220, the transmission terminal 110 may determine second data to be transmitted after the first data has been transmitted by using the feedback information that relates to the first data, which is received from the plurality of reception terminals 120, 130, and 140.

The transmission terminal 110 may receive the feedback information that relates to the first data from each of the plurality of reception terminals 120, 130, and 140.

The transmission terminal 110 according to the present exemplary embodiment may determine the second data based on at least one selected from among a data loss rate, an RTT, and a data reception rate, which are included in the received feedback information. For example, the transmission terminal 110 may determine a suitable number of second parity data segments for restoring the second source data segment to be included in the second data.

According to another exemplary embodiment, the transmission terminal 110 may select some of the plurality of reception terminals 120, 130, and 140 and determine at least one selected from among the number of second parity data segments to be included in the second data and the transmission rate of the second data. For example, the transmission terminal 110 may select a terminal having the highest data loss rate and a terminal having the lowest data loss rate, based on the feedback information received from the plurality of reception terminals 120, 130, and 140. The transmission terminal 110 may determine at least one selected from among the number of second parity data segments to be included in the second data and the transmission rate of the second data, taking into consideration the cause of the data loss according to the feedback information received from the selected reception terminals. Details thereof will be described below with reference to FIGS. 5 and 6.

The transmission terminal 110 according to the present exemplary embodiment may receive a retransmission request for the lost data from the reception terminal (for example, 120). The retransmission request may be transmitted to the transmission terminal 110 together with the feedback information. For example, the transmission terminal 110 may confirm the data segment lost in the reception terminal (for example, 120), based on identification information relating to the lost data segment that is included in the feedback information. According to another exemplary embodiment, the transmission terminal 110 may receive the retransmission request from the reception terminal (for example, 120) separately from receiving the feedback information. In the following, it is assumed that information that relates to the lost data segment, which is transmitted from the reception terminal (for example, 120), is received in response to the retransmission request separately from the reception of the feedback information.

The transmission terminal 110 may compare identification information that relates to the lost data segment, which is included in the received retransmission request, with identification information that relates to the data segment, which is transmitted by the transmission terminal 110. The transmission terminal 110 may determine whether to retransmit the data segment that corresponds to the identification information included in the retransmission request, based on a result of the comparing.

In operation S230, the transmission terminal 110 may transmit the determined second data to each of the plurality of reception terminals 120, 130, and 140.

The transmission terminal 110 according to the present exemplary embodiment may determine the number of at least one data segment to be included in the second data according to the determined transmission rate. The second data may include at least one selected from among the second source data segment, the second parity data segment for restoring the second source data segment, and the first parity data segment for restoring the first source data segment that has been previously transmitted.

For example, when the determined transmission rate is lower than the transmission rate of the first data, the transmission terminal 110 may decrease the number of data segments to be included in the second data, as compared with the number of data segments included in the first data. According to another exemplary embodiment, when the determined transmission rate is higher than the transmission rate of the first data, the transmission terminal 110 may increase the number of data segments to be included in the second data, as compared with the number of data segments included in the first data.

Figure 3:
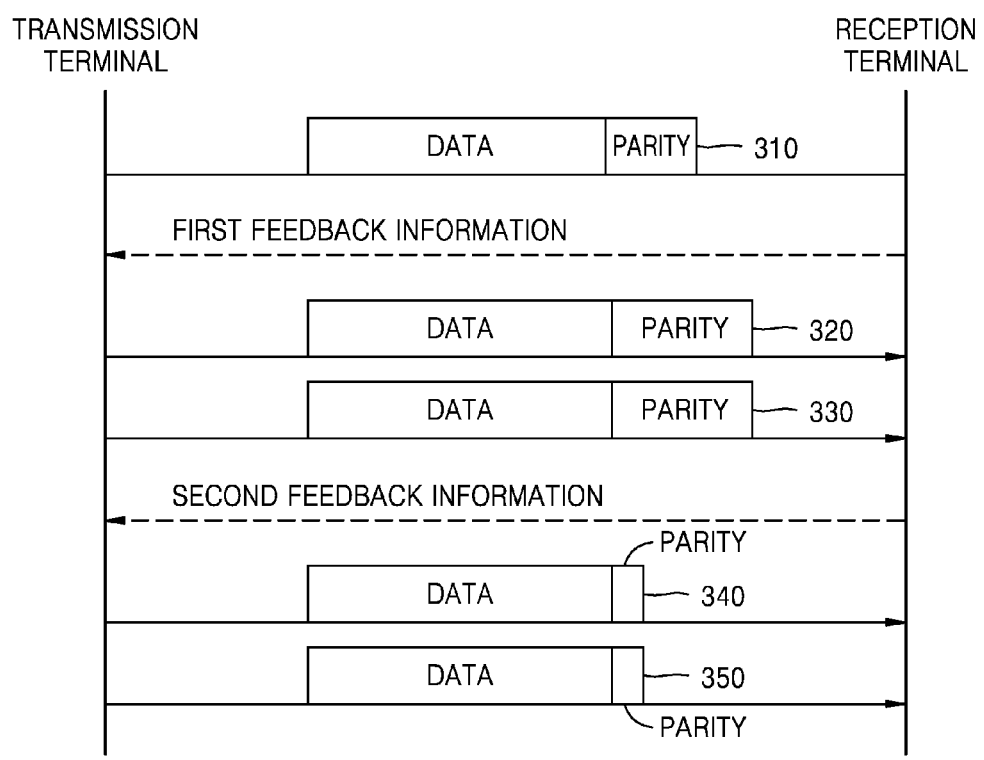
FIG. 3 is a data flow diagram of a method for transmitting and receiving data between a transmission terminal and a reception terminal, according to an exemplary embodiment.

FIG. 3 is a data flow diagram of a method for transmitting and receiving data between the transmission terminal 110 and the reception terminal (for example, 120), according to an exemplary embodiment.

The transmission terminal 110 may transmit first data 310 to the reception terminal (for example, 120). The first data 310 may include a first source data segment and a first parity data segment.

The transmission terminal 110 may receive first feedback information that relates to the transmitted first data 310 from the reception terminal (for example, 120). The transmission terminal 110 may acquire information that relates to at least one selected from among a data loss rate, an RTT, and a data reception rate of the first data with respect to the reception terminal (for example, 120) via the received first feedback information.

When a data loss rate of data that includes K source data segments and (N–K) parity data segments is k, the transmission terminal 110 according to the present exemplary embodiment may determine a probability D (N, K, p) of restoration of the source data segment, based on Equation 1 or 2 below:

$$D(N, K, p) = \sum_{i=k}^{N} \binom{N}{i} p^{N-i}(1-p)^i \quad \text{[Equation 1]}$$
$$= 1 - Pr(X \leq K - 1)$$

$$D(N, K, P) \approx 1 - P_r\left(Z \leq \frac{K - 0.5 - N \cdot p}{\sqrt{N \cdot p \cdot (1-p)}}\right) \quad \text{[Equation 2]}$$
$$= \frac{1}{2} - \frac{1}{2}\text{erf}\left(\frac{K - 0.5 - N \cdot p}{\sqrt{2N \cdot p \cdot (1-p)}}\right)$$

In Equation 2, a binomial distribution based on the De Moivre-Laplace theorem may be approximated to a normal distribution. The normal distribution may be represented by a Q-function, and the Q-function and an error function (erf) has the following relationship:

$$Q(x) = \frac{1}{2} - \frac{1}{2}\text{erf}\left(\frac{2}{\sqrt{2}}\right)$$

The transmission terminal 110 may determine the data loss rate k and the number of data segments received by the reception terminal (for example, 120), based on the feedback information received from the reception terminal (for example, 120). The transmission terminal 110 may determine the number of parity data segments transmitted together with the source data segments, based on the received feedback information and Equations 1 and 2.

In addition, the transmission terminal 110 may store information that relates to a retransmission request for the data previously transmitted to the reception terminal (for example, 120). When data restoration in the reception terminal (for example, 120) is difficult due to data loss, the retransmission request may be transmitted from the reception terminal (for example, 120) to the transmission terminal 110. The retransmission request may include information that relates to the number of data segments to be retransmitted and identification numbers of the data segments.

The transmission terminal 110 may determine the number of additional parity data segments in preparation for the retransmission request of the reception terminal (for example, 120) for the first data, based on the information that relates to the retransmission request for the previously transmitted data.

The transmission terminal 110 may determine that the data loss rate between the transmission terminal 110 and the reception terminal (for example, 120) is relatively high, based on the first feedback information. The transmission terminal 110 may increase the number of second parity data segments to be included in the second data 320 to be transmitted after the first data 310 has been transmitted, based on the data loss rate and the information that relates to the retransmission request received from the reception terminal (for example, 120). The transmission terminal 110 may transmit some of the generated second parity data segments to the reception terminal (for example, 120) together with the second source data segments, and may store the remaining second parity data segments in preparation for the retransmission request.

Conversely, the transmission terminal 110 may maintain the increased number of second parity data segments until a time point before the transmission terminal 110 receives the second feedback information after the first feedback information has been received. The transmission terminal 110 may determine the number of third parity data segments to be included in third data 330, equally to the increased number of the second parity data segments.

In addition, the transmission terminal 110 may receive second feedback information that relates to the data 320 and 330, which are transmitted after the first feedback information has been transmitted, from the reception terminal (for example, 120). The transmission terminal 110 may decrease the number of fourth parity data segments to be included in the fourth data 340 which is transmitted after the third data 330 has been transmitted, based on the received second feedback information and the information that relates to the retransmission request for the previously transmitted data, which is received from the reception terminal (for example, 120).

Conversely, the transmission terminal 110 may maintain the decreased number of fourth parity data segments until a time point before the transmission terminal 110 receives additional feedback information after the second feedback information has been received. The transmission terminal 110 may determine the number of fifth parity data segments to be included in fifth data 350, equally to the decreased number of the fourth parity data segments.

Figure 4:
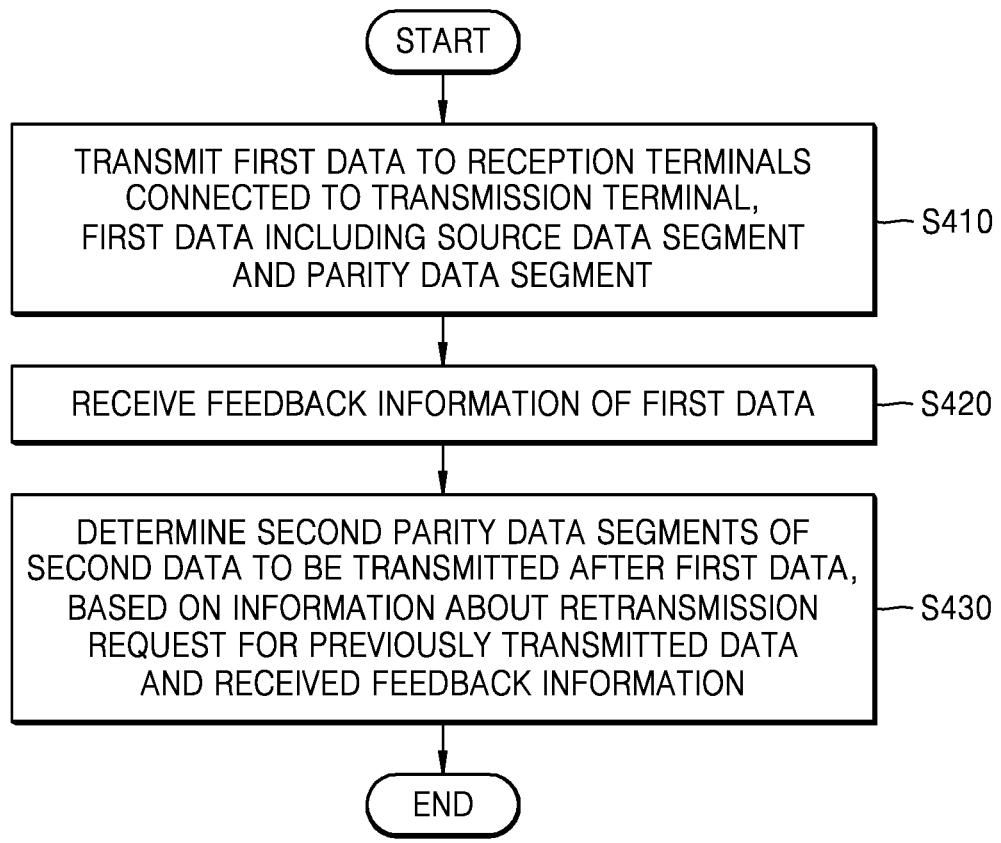
FIG. 4 is a flowchart of a method for adjusting the number of parity data segments to be transmitted to a reception terminal, which is performable by a transmission terminal, according to an exemplary embodiment.

FIG. 4 is a flowchart of a method for adjusting the number of parity data segments to be transmitted to the plurality of reception terminals 120, 130, and 140, which is performable by the transmission terminal 110, according to an exemplary embodiment.

In operation S410, the transmission terminal 110 may transmit first data to each of the plurality of reception terminals 120, 130, and 140 connected to the transmission terminal 110, the first data including a source data segment and a parity data segment.

The transmission terminal 110 according to the present exemplary embodiment may transmit first data to each of the plurality of reception terminals 120 130, and 140 by using a multicast scheme.

Operation S410 may correspond to operation S210 described above with reference to FIG. 2.

In operation S420, the transmission terminal 110 may receive feedback information that relates to the first data from each of the plurality of reception terminals 120, 130, and 140. The feedback information may include information that relates to at least one selected from among a data loss rate, an RTT, and a data reception rate of each of the plurality of reception terminals 120, 130, and 140.

In operation S430, the transmission terminal 110 may determine second parity data segments of second data, based on information that relates to a retransmission request for data previously transmitted to each of the plurality of reception terminals 120, 130, and 140 and the received feedback information. The second parity data segments may include restoration information that relates to the second source data segments included in the second data.

The transmission terminal 110 according to the present exemplary embodiment may store the information that relates to the retransmission request previously received from each of the plurality of reception terminals 120, 130, and 140. The information that relates to the retransmission request may include information that relates to at least one selected from among a reception time point of the retransmission request, identification information that relates to retransmission-requested data segments, and the number of the retransmission-requested data segments.

The transmission terminal 110 according to the present exemplary embodiment may detect information that relates to a transmission time point of the first data and a retransmission request received in a certain time range from the information that relates to the retransmission request. The transmission terminal 110 may determine the number of second parity data segments to be included in the second data, based on the detected information that relates to the retransmission request and the feedback information. For example, as the number of times of the retransmission requests received by the transmission terminal 110 and the number of retransmission-requested data segments increase, the transmission terminal 110 may increase the number of second parity data segments to be included in the second data.

According to another exemplary embodiment, the transmission terminal 110 may apply a higher weight value to information that relates to a latest retransmission request than other retransmission requests among pieces of information that relates to the retransmission requests. The transmission terminal 110 may determine the number of second parity data segments based on the feedback information and the information that relates to the retransmission request to which the weight value is applied.

The transmission terminal 110 may transmit some of the determined second parity data segments to the reception terminal (for example, 120) together with the second source data segments, and then transmit the remaining second parity data segments to the reception terminal (for example, 120) when the retransmission request is received from the reception terminal (for example, 120).

Figure 5:
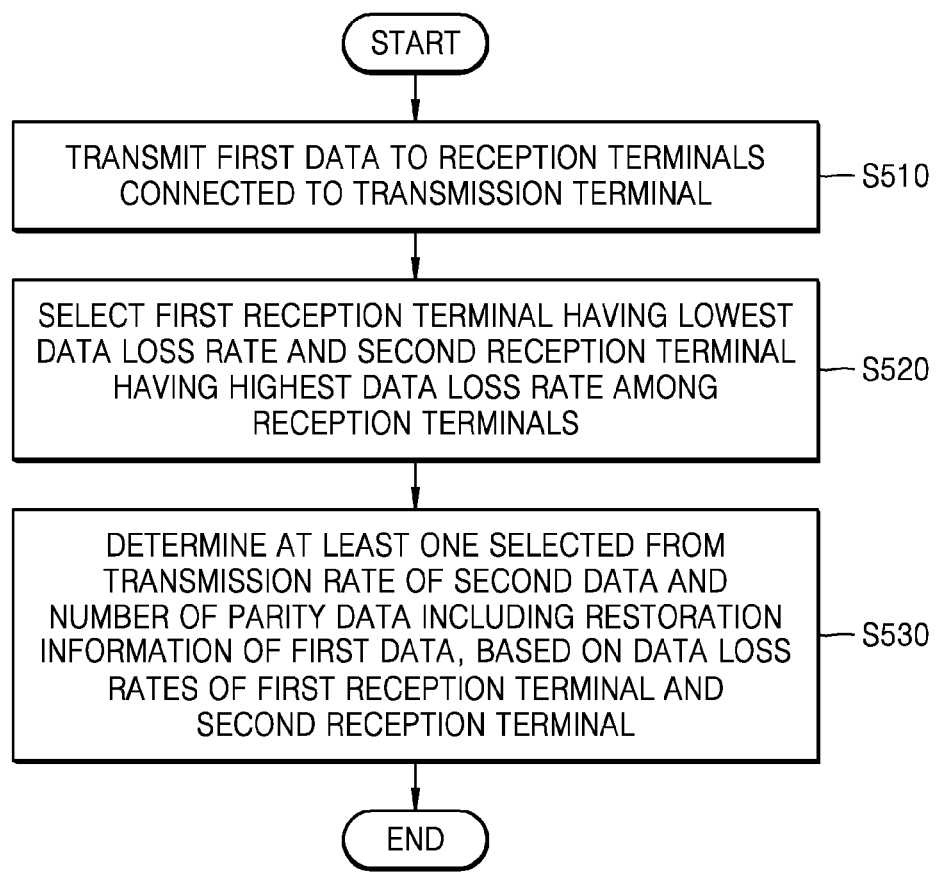
FIG. 5 is a flowchart of a method for determining second data based on feedback information provided by a reception terminal selected from among a plurality of reception terminals, which is performable by a transmission terminal, according to an exemplary embodiment.

FIG. 5 is a flowchart of a method for determining second data based on feedback information that relates to the reception terminal selected from among the plurality of reception terminals 120, 130, and 140, which is performable by the transmission terminal 110, according to an exemplary embodiment.

In operation S510, the transmission terminal 110 may transmit first data to each of the plurality of reception terminals 120, 130, and 140 connected to the transmission terminal 110.

Operation S510 may correspond to operation S210 described above with reference to FIG. 2.

In operation S520, the transmission terminal 110 may select a first reception terminal having the lowest data loss rate of the first data and a second reception terminal having the highest data loss rate of the first data, based on the feedback information received from each of the plurality of reception terminals 120, 130, and 140.

For example, the transmission terminal 110 may receive feedback information indicating that the reception terminal 120 has received four data segments from among five data segments included in the first data. According to another exemplary embodiment, the transmission terminal 110 may receive feedback information indicating that the reception terminal 130 has received two data segments from among the five data segments included in the first data. Further, the transmission terminal 110 may receive feedback information indicating that the reception terminal 140 has received one data segment from among the five data segments included in the first data. The transmission terminal 110 may select the reception terminal 120, which has the lowest data loss rate, as the first reception terminal and select the reception terminal 140, which has the highest data loss rate, as the second reception terminal, based on the received feedback information.

The feedback information may include identification information indicating the reception terminal that has transmitted the feedback information. In addition, the feedback information may include information that relates to a reception time point of the data.

In operation S530, the transmission terminal 110 may determine a suitable number of parity data segments, based on the data loss rates of the first reception terminal and the second reception terminal.

The transmission terminal 110 may determine that a channel gain between the transmission terminal 110 and the first reception terminal 120 having the lowest data loss rate is highest. In addition, the transmission terminal 110 may determine that the data loss of the first reception terminal 120 having the lowest data loss rate is caused by buffer overflow.

In determining the data loss rate caused by the buffer overflow, the transmission terminal 110 according to the present exemplary embodiment may consider only the data loss rate of the selected first reception terminal 120, without considering the data loss rates of all the reception terminals 120, 130, and 140 that have transmitted the feedback information.

The transmission terminal 110 may determine the data loss rate of the first reception terminal 120 having the lowest data loss rate as the data loss rate caused by the buffer overflow.

The transmission terminal 110 may determine the transmission rate of the second data based on the data loss rate caused by the RTT of the first data and the buffer overflow. The transmission terminal 110 may confirm the RTT of the first data from the feedback information received from the first reception terminal 120.

The transmission terminal 110 may determine the transmission rate of the second data based on Equations 3 to 11 below:

$$D_i = N_i C_i + \tfrac{1}{2} C_i (C_i - 1),$$ [Equation 3]

In Equation 3, $D_i$ represents the total sum of data amounts transmitted in an $i^{th}$ section. The data amount may be determined according to, for example, the number of transmitted data segments. In addition, the section may be determined according to a time point at which data loss has occurred. For example, loss of data for which transmission starts at a time point "a" may occur at a time point "b" and then occur again at a time point "c". In this case, a section from the time point "a" to the time point "b" may correspond to a first section, and a section from the time point "b" to the time point "c" may correspond to a second period.

$C_i$ represents an RTT at which data loss in the $i^{th}$ section has occurred. For example, $C_1$ may be equal to five when five RTTs exist in the first section and the data loss has occurred during the fifth RTT. $N_i$ may represent an average data amount that is transmitted per RTT.

$N_i$ may be determined based on Equation 4 below:

$$N_i = N_{i-1}(1 - p_i) + \frac{1}{C_i} \sum_{k=0}^{C_i - 1} k,$$ [Equation 4]

In Equation 4, $P_i$ represents a probability that the data loss will occur in the $i^{th}$ section. In addition, K may be determined based on an increase in the amount of data in RTT units in each section.

The transmission terminal 110 may determine a non-lost data amount based on Equation 5 below:

$$E[b_i] = \Sigma k (1-p_i)^{k-1} p_i$$ [Equation 5]

$E[b_i]$ represents the non-lost data amount. $P_i$ and K represent a probability that the data loss will occur and an increase in the amount of data in RTT units, respectively, as described with reference to Equation 4.

The total sum of the data amounts transmitted in the $i^{th}$ section may be determined based on Equation 6 below, in addition to Equation 3 above:

$$D_i = \frac{1}{1 - p_i}\left(\frac{1}{p_i} - 1\right)$$ [Equation 6]

In addition, when it is assumed that the probabilities that the data loss will occur at each RTT in the $i^{th}$ section are mutually independent of one another, an average data loss amount in the RTT may be determined based on Equation 7 below:

$$E[C] = 2pE[N] + 1.$$ [Equation 7]

In Equation 7, E[C] represents the average data loss amount in the RTT. In addition, the transmission terminal 110 may determine the average data transmission amount in the section based on Equation 8 below:

$$E[D] = E[N](2pE[N]+1)(1+p)$$ [Equation 8]

In Equation 8, E[D] represents the average data transmission amount in the section. E[N] may be determined based on Equations 9 and 10 below: E[N} represents the average data transmission amount per RTT in entire sections.

$$\frac{1}{1-p}\left(\frac{1}{p} - 1\right) = E[N](2pE[N] + 1)(1 + p)$$ [Equation 9]

$$E[N] = \frac{-(1+p) + \sqrt{(1+p)^2 + 8p(1+p)\left(\frac{1}{p} - 1\right)\left(\frac{1}{1-p}\right)}}{4p(1+p)}$$ [Equation 10]

The transmission terminal 110 according to the present exemplary embodiment may determine the transmission rate based on Equation 11 below:

$$S_i = \frac{E[N]}{RTT_i} \cdot \text{nominal\_packet\_size}$$ [Equation 11]

In Equation 11, $S_i$ represents the transmission rate. In addition, RTTi represents the RTT of data in the $i^{th}$ section, and nominal_packet_size represents an average data segment size.

The method for determining the transmission rate of the second data, which is performable by the transmission terminal 110, is not limited to the above-described method.

The transmission terminal 110 according to the present exemplary embodiment may predict that a channel gain between the transmission terminal 110 and the second reception terminal having the highest data loss rate is lower than a channel gain between the transmission terminal 110 and other reception terminals. Therefore, the transmission terminal 110 may determine that the data loss occurring in the second reception terminal is caused by channel error as well as by buffer overflow. The transmission terminal 110 may predict a difference between the data loss rate occurring in the second reception terminal and the data loss rate occurring in the first reception terminal as being equal to the data loss rate caused by the channel error.

The transmission terminal 110 may determine the parity data segments, including the restoration information that relates to the first data, based on the predicted data loss rate caused by the channel error. The transmission terminal 110 according to the present exemplary embodiment may determine the number of parity data segments based on the data loss rate caused by the channel error.

Figure 6:
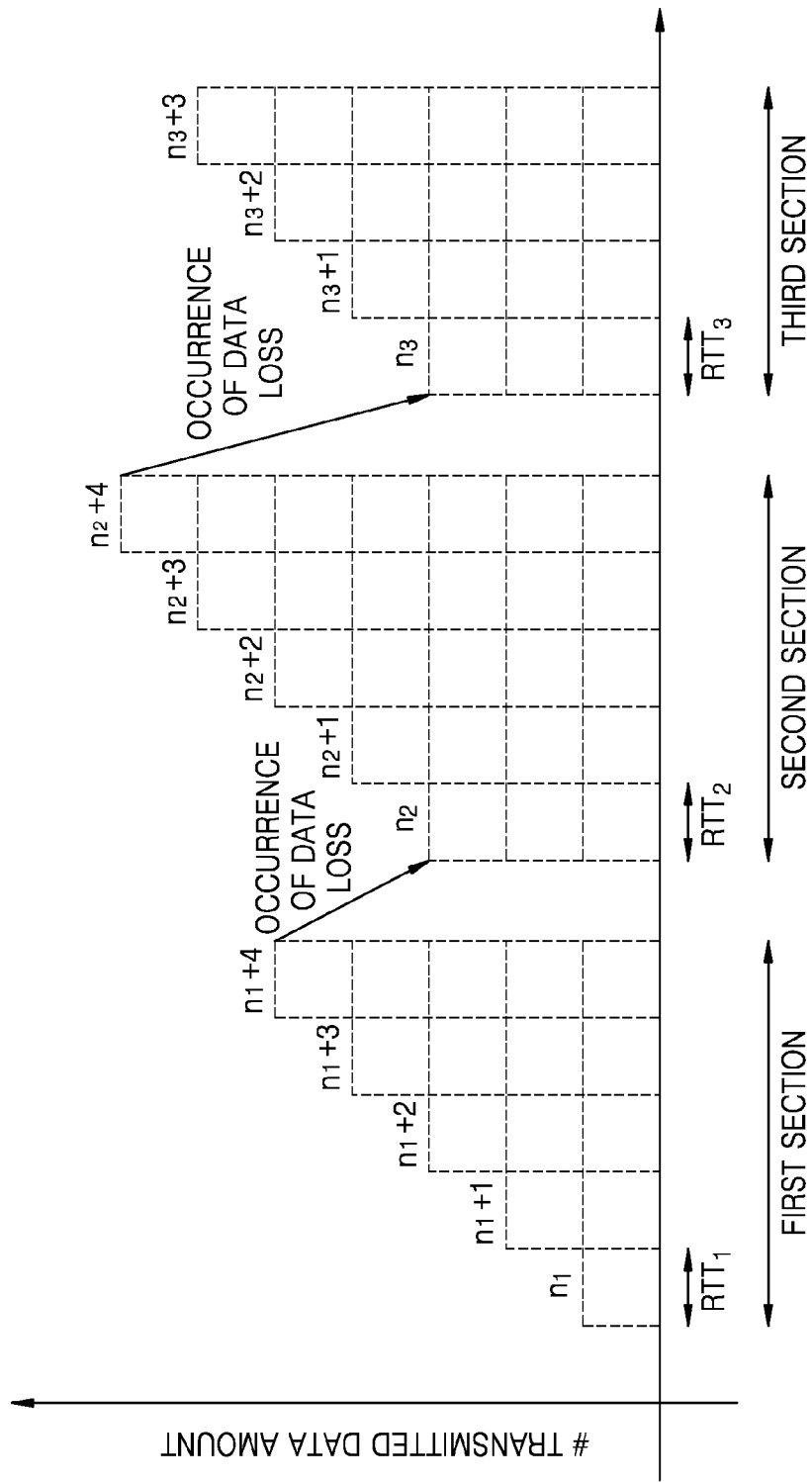
FIG. 6 is a graph showing a data amount transmitted by a transmission terminal, according to an exemplary embodiment.

FIG. 6 is a graph showing a data amount transmitted by the transmission terminal 110, according to an exemplary embodiment.

In the graph of FIG. 6, the x-axis represents time, and the y-axis represents the data amount transmitted from the transmission terminal 110 to each of the plurality of reception terminals 120, 130, and 140.

The transmission terminal 110 may increase the data amount transmitted to each of the plurality of reception terminals 120, 130, and 140 at each RTT until a time point before the data loss occurs. For example, the transmission terminal 110 may increase data transmitted at each RTT by one data segment.

The transmission terminal 110 may transmit data that includes n1 data segments to each of the plurality of reception terminals 120, 130, and 140 at RTT1. In addition, the transmission terminal 110 may transmit data, in which the number of data segments is sequentially increased by one, to each of the plurality of reception terminals 120, 130, and 140 at each RTT from RTT2 to RTT5.

The transmission terminal 110 may determine whether data has been lost, based on the feedback information. The transmission terminal 110 may confirm that the data has been lost at RTT5, based on the feedback information. The transmission terminal 110 may decrease the transmission data amount at RTT6 after RTT5 at which the data has been lost. For example, the transmission terminal 110 may decrease the number of data segments which have been transmitted at RTT5, i.e., n1+4, to n2 data segments.

Conversely, as the transmitted data is lost at RTT5, the second section may start from RTT6. A section from RTT1 to RTT5 may define a first section. The transmission terminal 110 may transmit n2 data segments to each of the plurality of reception terminals 120, 130, and 140 at RTT6, based on the feedback information received from the plurality of reception terminals 120, 130, and 140. In addition, the transmission terminal 110 may transmit data, in which the number of data segments is sequentially increased by one, to each of the plurality of reception terminals 120, 130, and 140 at each RTT from RTT6 to RTT10. The second section may include RTTs from RTT6 to RTT10 at which the data loss has occurred.

As the transmitted data is lost at RTT10, a third section may start from RTT11. The transmission terminal 110 may transmit n3 data segments to each of the plurality of reception terminals 120, 130, and 140 at RTT11. In addition, the transmission terminal 110 may transmit data, in which the number of data segments is sequentially increased by one, to each of the plurality of reception terminals 120, 130, and 140 at each RTT from RTT11 to RTT14. The third section may include RTTs from RTT11 to RTT14 at which the data loss has occurred.

Figure 7:
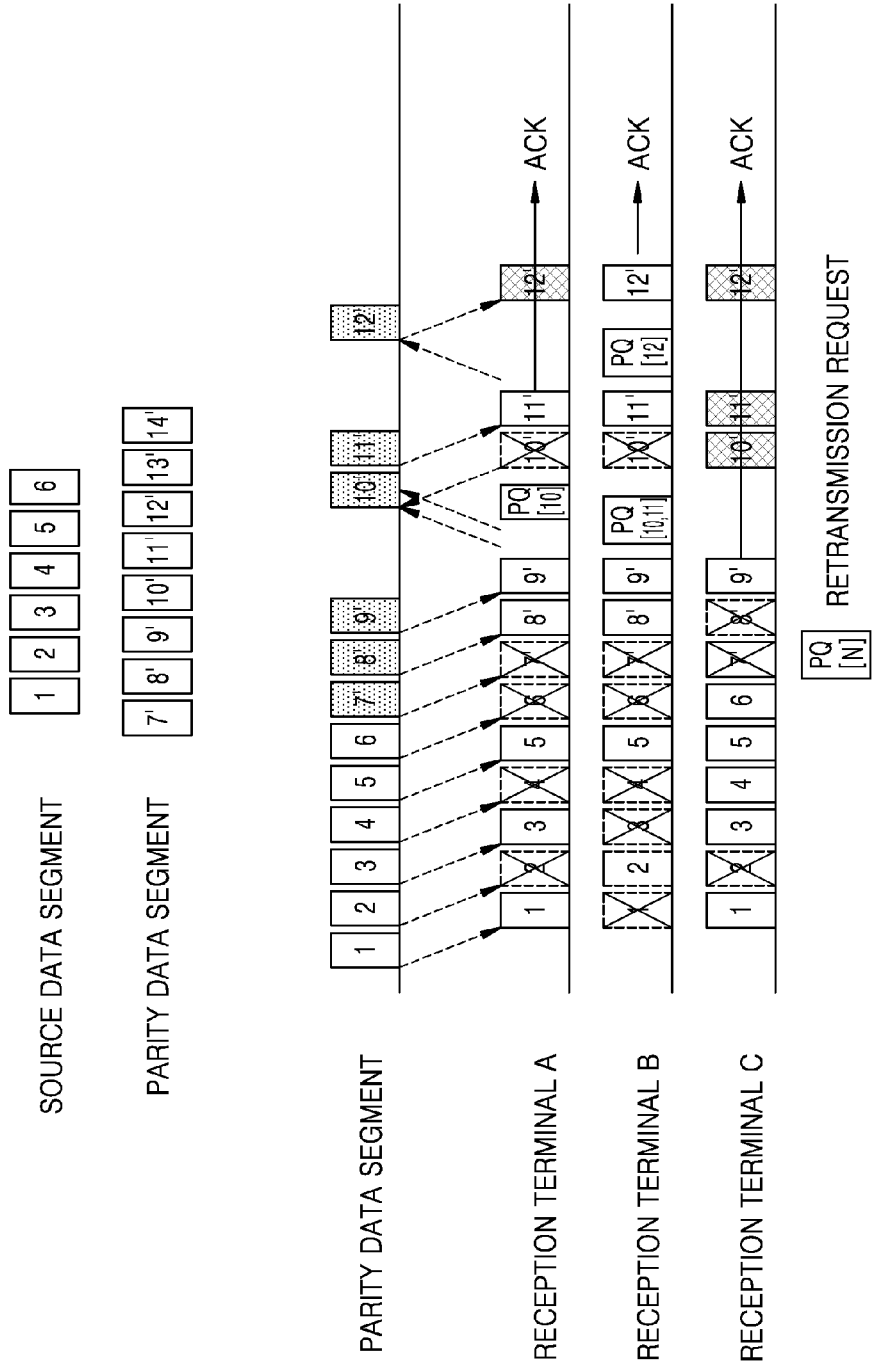
FIG. 7 is a diagram for describing a method for transmitting data segments in response to a retransmission request received from a reception terminal, which is performable by a transmission terminal, according to an exemplary embodiment.

FIG. 7 is a diagram for describing a method for transmitting data segments in response to a retransmission request received from the reception terminal (for example, 120), which is performable by the transmission terminal 110, according to an exemplary embodiment.

Referring to FIG. 7, the transmission terminal 110 may transmit first data to each of the plurality of reception terminals 120, 130, and 140, the first data including first source data segments and first parity data segments.

When the occurrence of data loss is detected, the reception terminal (for example, 120) according to the present exemplary embodiment may transmit a retransmission request to the transmission terminal 110 for efficient transmission and reception of data.

The transmission terminal 110 may determine whether to transmit data segments, based on the retransmission request received from the reception terminal (for example, 120). Information that relates to the retransmission request may include identification information that relates to the retransmission-requested data segments.

The transmission terminal 110 may not transmit the requested data segments when a retransmission request for the same data segment is repeatedly received for a preset time or when a retransmission request for data segments prior to the subsequently transmitted data segments is received for a preset time. The preset time may be set to, for example, ½ of the RTT.

In FIG. 7, the first reception terminal 120 may transmit a retransmission request for a lost tenth parity data segment to the transmission terminal 110. Since it is determined based on the received retransmission request that an eleventh parity data segment subsequent to the tenth parity data segment has been transmitted to the first reception terminal 120, the transmission terminal 110 may ignore the retransmission request for the tenth parity data segment. The first reception terminal 120 may restore the source data segment based on the data segments received before the retransmission request is transmitted and the eleventh parity data segment.

The second reception terminal 130 may transmit a retransmission request for the lost tenth and eleventh parity data segments to the transmission terminal 110. The transmission terminal 110 may retransmit only the eleventh parity data segment to the second reception terminal 130 according to a result of a determination based on the received retransmission request. In addition, the transmission terminal 110 may transmit a twelfth parity data segment to the transmission terminal 110 when a retransmission request for the twelfth parity data segment is received. The second reception terminal 130 may restore the source data segment based on the received data segments.

Since the ninth parity data segment has been successfully received, the third reception terminal 140 may determine that the source data segment is restorable, by using the received data segment. By transmitting, to the transmission terminal 110, a signal indicating that the source data segment is restorable, the third reception terminal 140 may prevent the parity data segment from being repeatedly transmitted from the transmission terminal 110.

Figure 8:
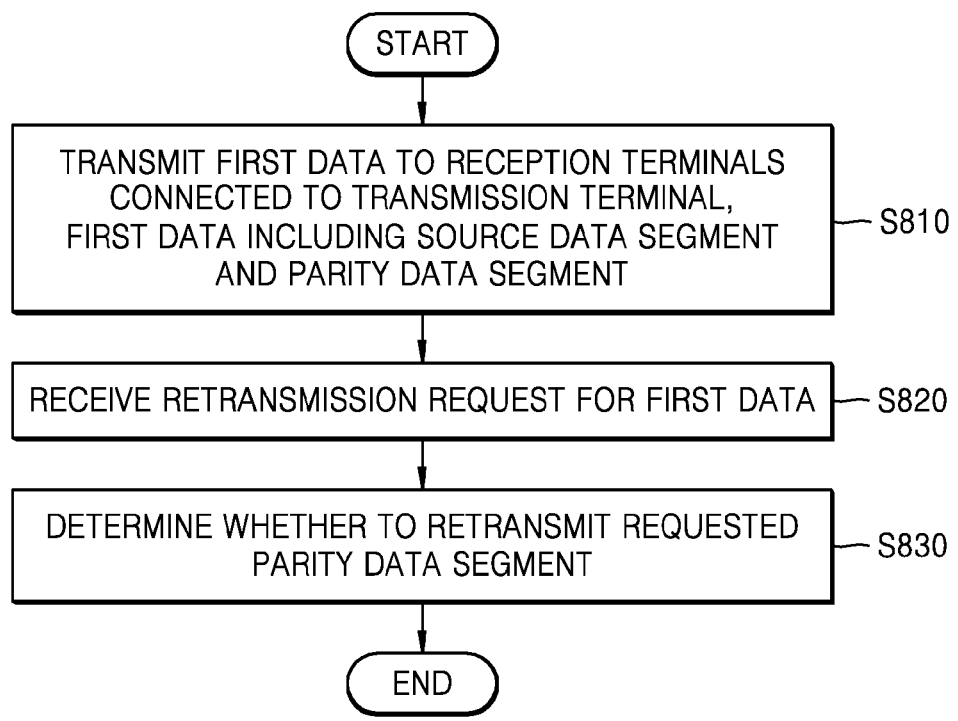
FIG. 8 is a flowchart of a method for transmitting data segments in response to a retransmission request received from a reception terminal, which is performable by a transmission terminal, according to an exemplary embodiment.

FIG. 8 is a flowchart of a method for transmitting a data segment in response to a retransmission request received from the reception terminal (for example, 120), which is performable by the transmission terminal 110, according to an exemplary embodiment.

In FIG. 8, it is assumed that a retransmission-requested data segment is a parity data segment.

In operation S810, the transmission terminal 110 may transmit first data to each of the plurality of reception terminals 120, 130, and 140 connected to the transmission terminal 110, the first data including a source data segment and a parity data segment.

The transmission terminal 110 according to the present exemplary embodiment may transmit the first data to each of the plurality of reception terminals 120 130, and 140 via a multicast scheme.

Operation S810 may correspond to operation S210 described above with reference to FIG. 2.

In operation S820, the transmission terminal 110 may receive a retransmission request for the first data from at least one selected from among the plurality of reception terminals 120, 130, and 140. The retransmission request may include identification information that relates to the retransmission-requested parity data segment.

In operation S830, the transmission terminal 110 may determine whether to retransmit the requested parity data segment, based on the received retransmission request. The transmission terminal 110 may determine whether to transmit the parity data segment based on the retransmission request received from the reception terminal (for example, 120).

The transmission terminal 110 may not transmit the requested data segment when a retransmission request for the same parity data segment is repeatedly received for a preset time or when a retransmission request for a data segment prior to the subsequently transmitted parity data segment is received for a preset time. The preset time may be set to, for example, ½ of the RTT.

Figure 9:
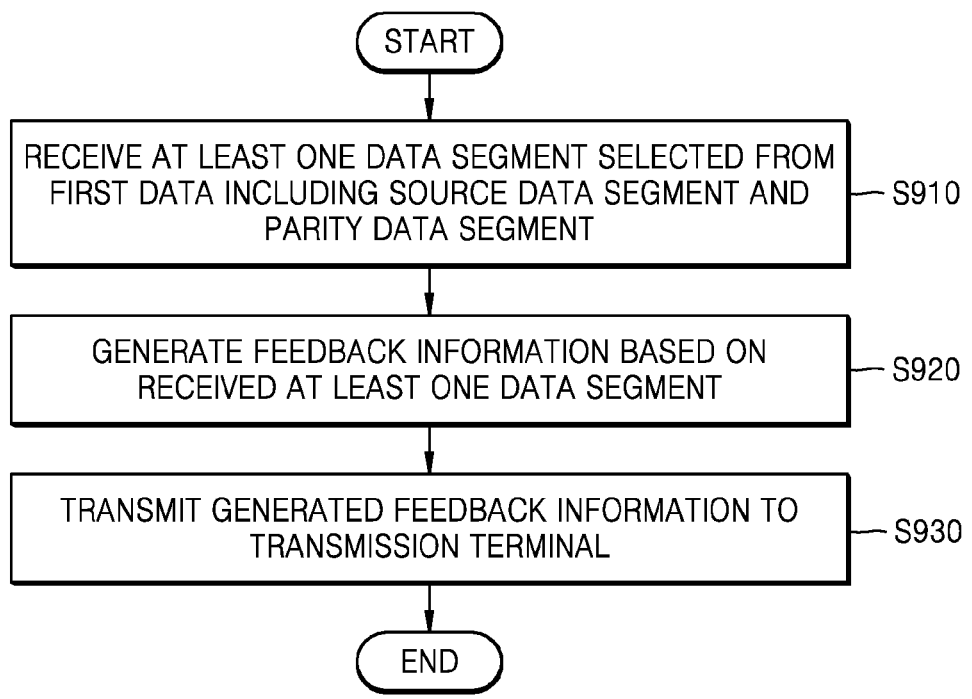
FIG. 9 is a flowchart of a method for transmitting and receiving data, which is performable by a reception terminal, according to an exemplary embodiment.

FIG. 9 is a flowchart of a method for transmitting and receiving data, which is performable by the reception terminal (for example, 120), according to an exemplary embodiment.

In operation S910, the reception terminal (for example, 120) may receive, from the transmission terminal 110, at least one data segment selected from among first data that includes a source data segment and a parity data segment.

The reception terminal (for example, 120) according to the present exemplary embodiment may receive the first data transmitted in the multicast scheme by the transmission terminal 110. The transmission terminal 110 may be connected to each of the plurality of reception terminals 120, 130, and 140 including the reception terminal 120. Each of the plurality of reception terminals 120, 130, and 140 may receive the first data from the transmission terminal 110.

In operation S920, the reception terminal (for example, 120) may generate feedback information that relates to the received first data. The first data according to the present exemplary embodiment may include at least one data segment having a preset size.

The reception terminal (for example, 120) according to the present exemplary embodiment may determine a reception time point of the first data. In addition, the reception terminal (for example, 120) may identify the received data segment by using an identification value that relates to at least one data segment included in the first data. For example, when three data segments from among five data segments included in the first data are lost, the reception terminal (for example, 120) may acquire identification information that relates to each of two data segments that are not lost.

In addition, the reception terminal (for example, 120) may acquire identification information that relates to the lost data segments. According to another exemplary embodiment, the reception terminal (for example, 120) may determine a data loss rate of the first data based on the number of data segments included in the first data and the number of lost data segments.

The reception terminal (for example, 120) may generate feedback information that includes at least one selected from among the identification information relating to the lost data segments in the first data and the data loss rate of the first data. In order to enable the transmission terminal 110 to identify which reception terminal has transmitted the feedback information, the generated feedback information may include identification information that relates to the reception terminal that has transmitted the feedback information.

In operation S930, the reception terminal (for example, 120) may transmit the generated feedback information to the transmission terminal.

The reception terminal (for example, 120) according to the present exemplary embodiment may determine a time point at which the generated feedback information is to be transmitted to the transmission terminal 110, based on the probing message received from the transmission terminal 110. Details thereof will be described below with reference to FIGS. 10 and 11.

The reception terminal (for example, 120) according to the present exemplary embodiment may transmit a retransmission request for the lost data to the transmission terminal 110. The retransmission request may be transmitted to the transmission terminal 110 together with the feedback information. For example, the transmission terminal 110 may confirm the data segment lost in the reception terminal (for example, 120), based on the identification information that relates to the lost data segment that is included in the feedback information. According to another exemplary embodiment, the reception terminal (for example, 120) may transmit the retransmission request to the transmission terminal 110 separately from the transmission of the feedback information.

Figure 10:
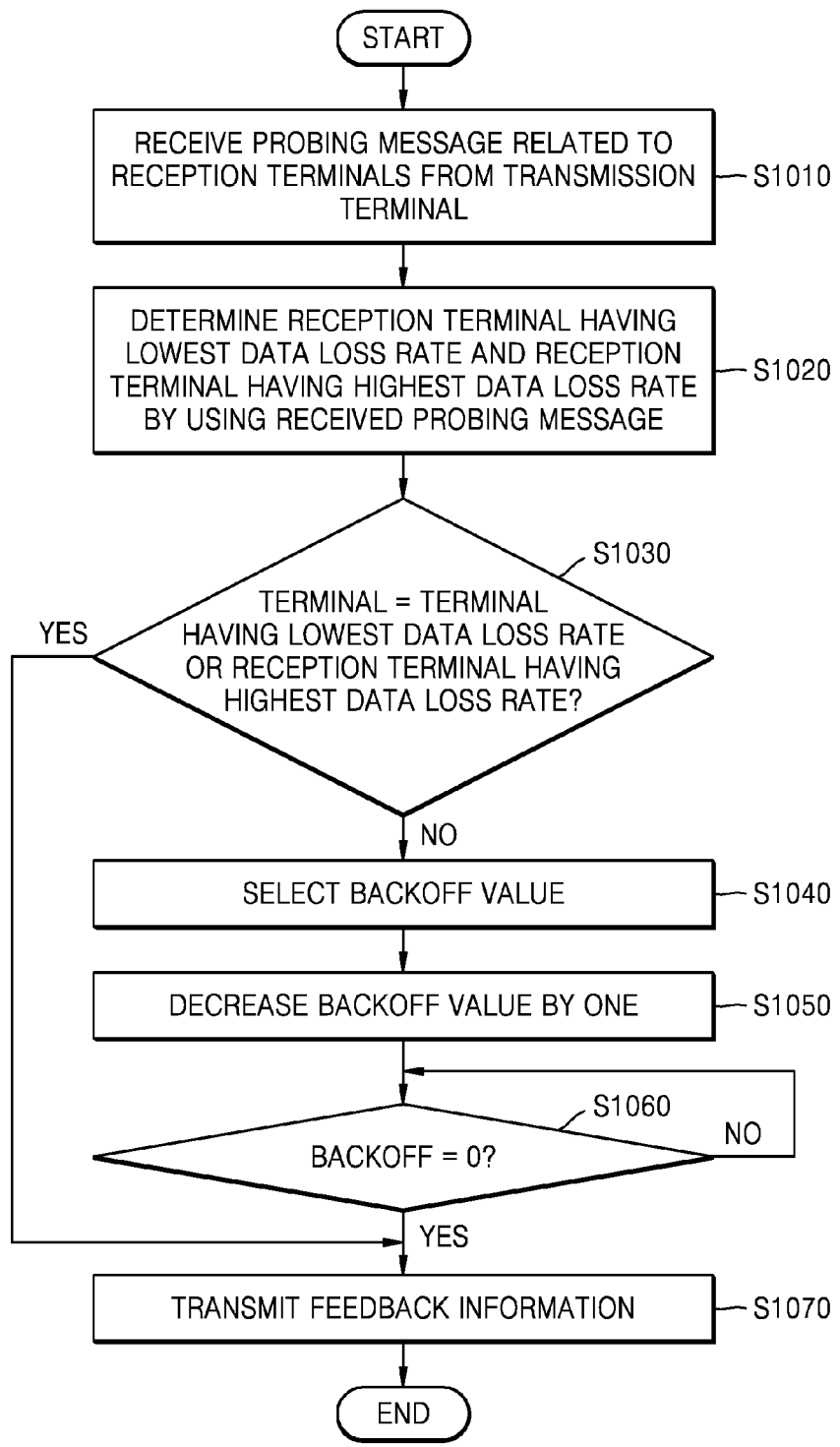
FIG. 10 is a flowchart of a method for transmitting feedback information to a transmission terminal based on a probing message received from a transmission terminal, which is performable by a reception terminal, according to an exemplary embodiment.

FIG. 10 is a flowchart of a method for transmitting feedback information to the transmission terminal 110 based on a probing message received from the transmission terminal 110, which is performable by the reception terminal (for example, 120), according to an exemplary embodiment.

In operation S1010, the reception terminal (for example, 120) may receive the probing message related to the plurality of reception terminals 120, 130, and 140 from the transmission terminal 110. The probing message may include information that relates to at least one selected from among a data loss rate, a data reception rate, and an RTT of each of the plurality of reception terminals 120, 130, and 140 connected to the transmission terminal 110. The probing message may be transmitted from the transmission terminal 110 to each of the plurality of reception terminals 120, 130, and 140 according to a preset period.

In operation S1020, the reception terminal (for example, 120) may determine a reception terminal having the lowest data loss rate and a reception terminal having the highest data loss rate by using the received probing message.

In operation S1030, the reception terminal (for example, 120) may determine whether the reception terminal (for example, 120) corresponds to one of the determined reception terminal having the lowest data loss rate and the determined reception terminal having the highest data loss rate.

In operation S1040, the reception terminal (for example, 120) may select a backoff value.

When the reception terminal (for example, 120) does not correspond to the reception terminal having the lowest data loss rate or the reception terminal having the highest data loss rate, the reception terminal (for example, 120) according to the present exemplary embodiment may determine a time point at which the feedback information is to be transmitted to the transmission terminal 110, which is later than the backoff so as to prevent the feedback information from overflowing to the transmission terminal 110. The backoff value, which represents a backoff duration, may be randomly determined.

When the reception terminal (for example, 120) does not correspond to the reception terminal having the lowest data loss rate or the reception terminal having the highest data loss rate, the reception terminal (for example, 120) may transmit the feedback information to the transmission terminal 110 without backoff.

In operation S1050, the reception terminal (for example, 120) may decrease the backoff value. The reception terminal (for example, 120) according to the present exemplary embodiment may decrease the backoff value by one whenever a time slot having a preset time unit elapses.

In operation S1060, the reception terminal (for example, 120) may determine whether the backoff has become equal to zero. The reception terminal (for example, 120) may determine whether the backoff duration has elapsed, based on the backoff value. When the backoff value becomes zero, the reception terminal (for example, 120) may determine that the backoff duration has elapsed.

In operation S1070, the reception terminal (for example, 120) may transmit the feedback information to the transmission terminal 110.

The reception terminal (for example, 120) according to the present exemplary embodiment may transmit the feedback information to the transmission terminal 110 after the backoff duration has elapsed. As described above, when the reception terminal (for example, 120) does not correspond to the reception terminal having the lowest data loss rate or the reception terminal having the highest data loss rate, the reception terminal (for example, 120) may transmit the feedback information to the transmission terminal 110 without backoff.

Figure 11:
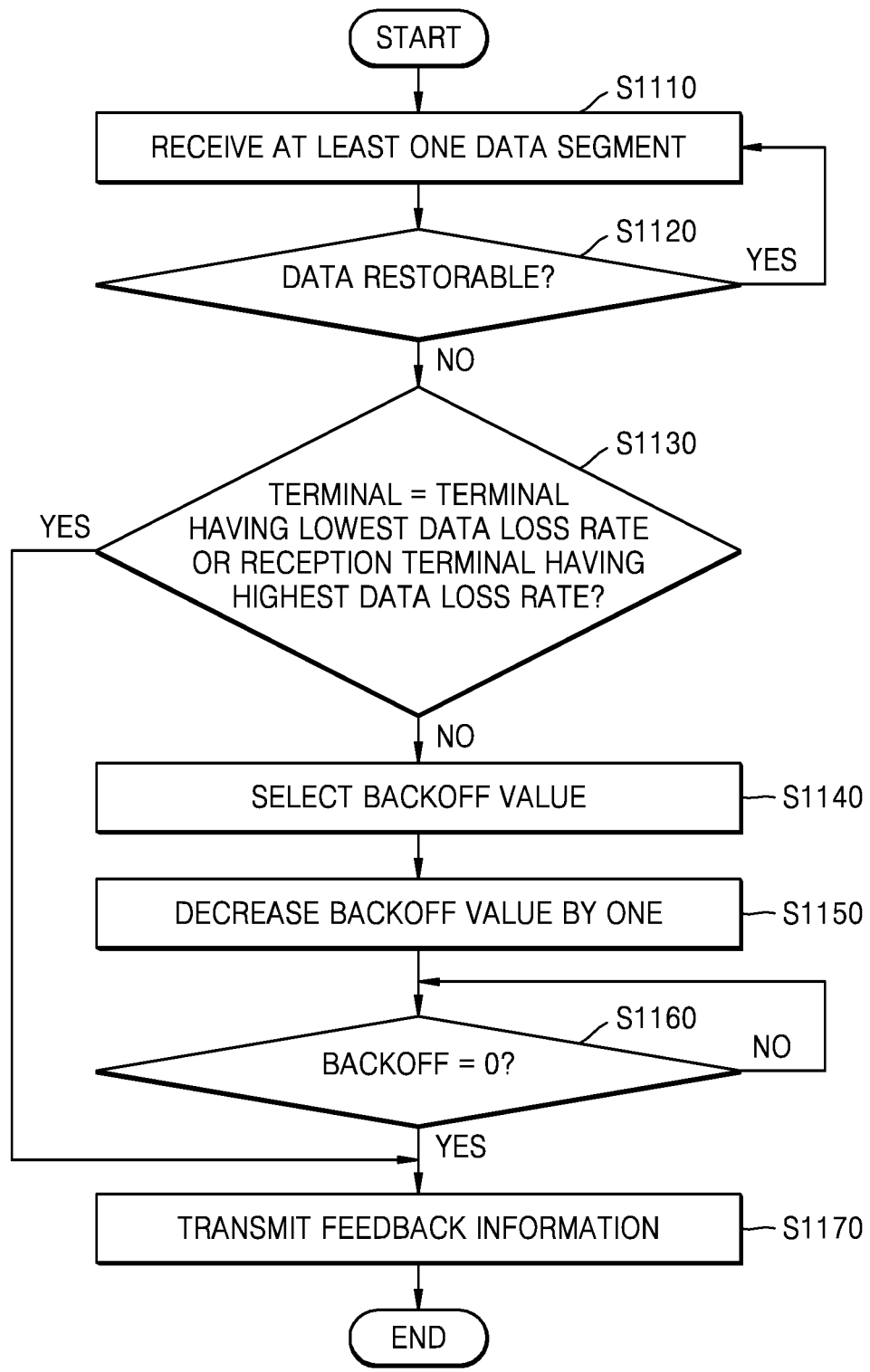
FIG. 11 is a flowchart of a method for transmitting feedback information to a transmission terminal based on a probing message received from a transmission terminal, which is performable by a reception terminal, according to another exemplary embodiment.

FIG. 11 is a flowchart of a method for transmitting feedback information to the transmission terminal 110 based on a probing message received from the transmission terminal 110, which is performable by the reception terminal (for example, 120), according to another exemplary embodiment.

In operation S1110, the reception terminal (for example, 120) may receive, from the transmission terminal 110, at least one data segment selected from among first data that include a source data segment and a parity data segment.

Operation S1110 may correspond to operation S910 described above with reference to FIG. 9.

In operation S1120, the reception terminal (for example, 120) may determine whether the source data segment from the received at least one data segment is restorable. When the received at least one data segment corresponds to the number of source data segments, the reception terminal (for example, 120) according to the present exemplary embodiment may determine that the source data segment is restorable. However, this is merely an example. The method of determining whether the source data segment is restorable, which is performable by the reception terminal (for example, 120), is not limited thereto.

In operation S1130, the reception terminal (for example, 120) may determine a reception terminal having the lowest data loss rate and a reception terminal having the highest data loss rate.

When the source data segment is not restorable from the received at least one data segment, the reception terminal (for example, 120) according to the present exemplary embodiment may determine the reception terminal having the lowest data loss rate and the reception terminal having the highest data loss rate among the plurality of reception terminals 120, 130, and 140 that are connected to the transmission terminal 110. When the source data segment is restorable from the received at least one data segment, the reception terminal (for example, 120) may receive data that includes a source data segment subsequent to the restored source data segment.

The reception terminal (for example, 120) according to the present exemplary embodiment may receive, from the transmission terminal 110, information that relates to at least one selected from among a data loss rate, a data reception rate, and an RTT of each of the plurality of reception terminals 120, 130, and 140 connected to the transmission terminal 110. The reception terminal (for example, 120) may determine a reception terminal having the lowest data loss rate and a reception terminal having the highest data loss rate, based on the information received from the transmission terminal 110.

In operation S1130, the reception terminal (for example, 120) may determine whether the reception terminal (for example, 120) corresponds to one of the determined reception terminal the lowest data loss rate and the determined reception terminal having the highest data loss rate.

In operation S1140, the reception terminal (for example, 120) may select a backoff value.

When the reception terminal (for example, 120) does not correspond to the reception terminal having the lowest data loss rate or the reception terminal having the highest data loss rate, the reception terminal (for example, 120) according to the present exemplary embodiment may determine a time point at which the feedback information is to be transmitted to the transmission terminal 110, which is later than the backoff so as to prevent the feedback information from overflowing to the transmission terminal 110. The backoff value, which represents a backoff duration, may be randomly determined.

When the reception terminal (for example, 120) does not correspond to the reception terminal having the lowest data loss rate or the reception terminal having the highest data loss rate, the reception terminal (for example, 120) may transmit the feedback information to the transmission terminal 110 without backoff.

In operation S1150, the reception terminal (for example, 120) may decrease the backoff value.

In operation S1160, the reception terminal (for example, 120) may determine whether the backoff has become equal to zero. When the backoff value becomes zero, the reception terminal (for example, 120) may determine that the backoff duration has elapsed.

In operation S1170, the reception terminal (for example, 120) may transmit the feedback information to the transmission terminal 110.

The reception terminal (for example, 120) according to the present exemplary embodiment may transmit the feedback information to the transmission terminal 110 after the backoff duration has elapsed. As described above, when the reception terminal (for example, 120) does not correspond to the reception terminal having the lowest data loss rate or the reception terminal having the highest data loss rate, the reception terminal (for example, 120) may transmit the feedback information to the transmission terminal 110 without backoff.

Figure 12:
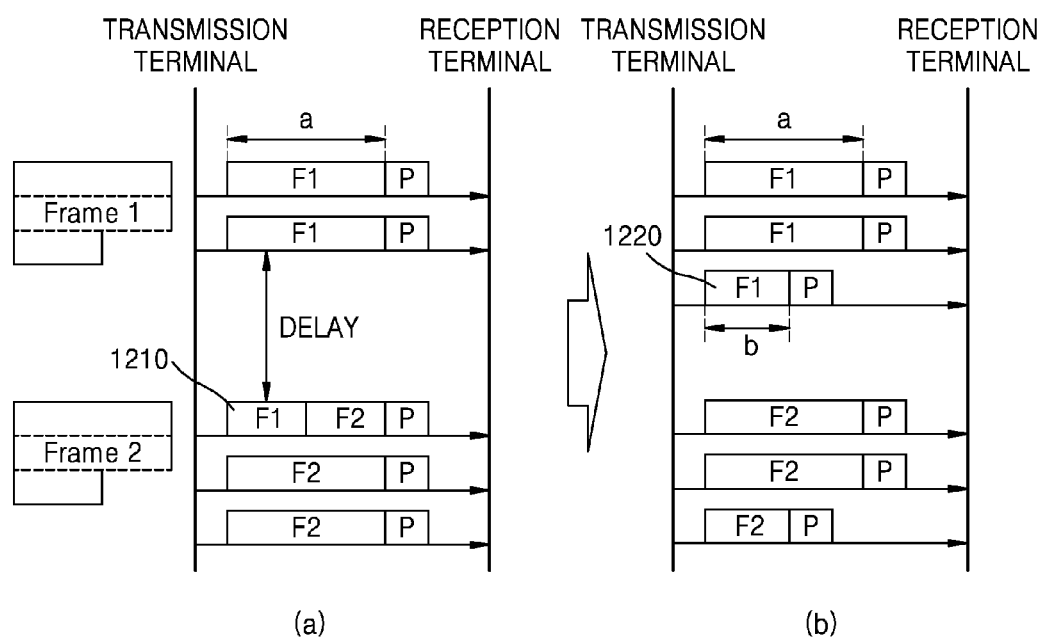
FIG. 12 is a data flow diagram of a method for determining a data size transmitted from a transmission terminal to a reception terminal, according to an exemplary embodiment.

FIG. 12 is a data flow diagram of a method for determining a data size transmitted from the transmission terminal 110 to the reception terminal (for example, 120), according to an exemplary embodiment.

The reception terminal (for example, 120) may receive data having a preset unit size from the transmission terminal 110. The transmission terminal 110 according to the present exemplary embodiment may adaptively determine the size of the data to be transmitted, based on a data transmission/reception condition with respect to the reception terminal (for example, 120) and the transmission terminal 110.

For example, when a video streaming service is executed in the reception terminal (for example, 120), the reception terminal (for example, 120) may receive a plurality of frames (for example, frame 1 and frame 2) from the transmission terminal 110.

Referring to drawing (a) of FIG. 12, the transmission terminal 110 may transmit data that constitutes a first frame to the reception terminal (for example, 120) in units of a preset size "a". When the size of data 1210 constituting the first frame that has not been transmitted to the reception terminal 120 is less than "a", the transmission terminal 110 may combine the data 1210 with data that constitutes a second frame and transmit the combined data to the reception terminal (for example, 120).

Referring to drawing (b) of FIG. 12, the transmission terminal 110 according to the present exemplary embodiment may transmit data 1220 to the reception terminal (for example, 120) even when the size of the data 1220 that has not been transmitted among the data constituting the first frame is less than "a". The transmission terminal 110 according to the present exemplary embodiment may determine the size of the data to be transmitted from the transmission terminal 110 to the reception terminal (for example, 120), based on at least one selected from among a size of data constituting the frame and a data transmission/reception condition with respect to the transmission terminal 110 and the reception terminal (for example, 120).

Figure 13:
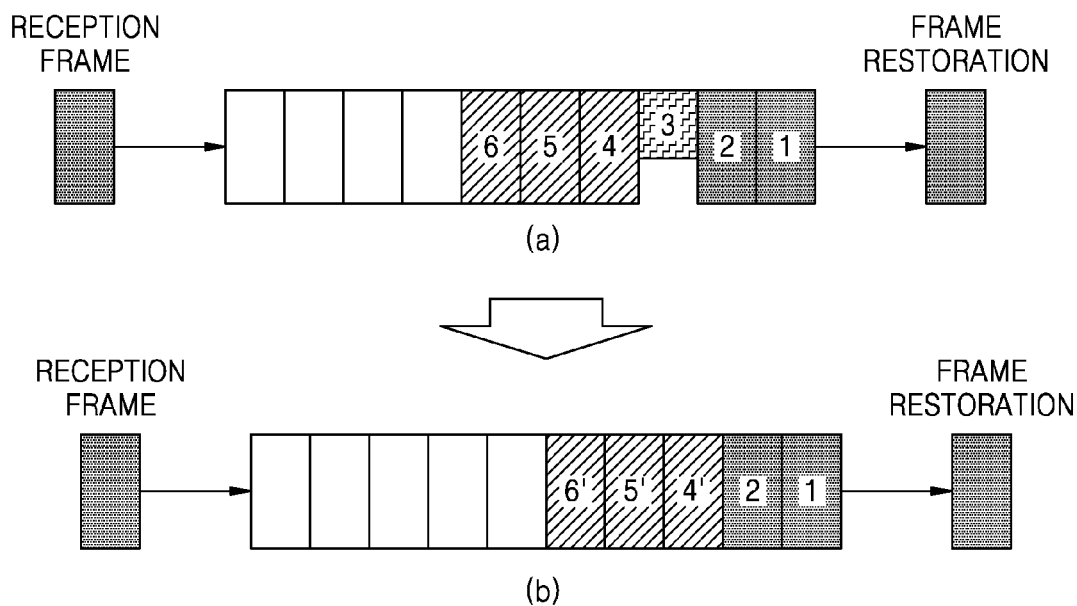
FIG. 13 is a diagram for describing a method for transmitting a retransmission request for lost data segments, based on data received by a reception terminal, according to an exemplary embodiment.

FIG. 13 is a diagram for describing a method for transmitting a retransmission request for lost data segments, based on data received by the reception terminal (for example, 120), according to an exemplary embodiment.

The reception terminal (for example, 120) according to the present exemplary embodiment may receive data from the transmission terminal 110 in a preset order. For example, the reception terminal (for example, 120) may receive an $i^{th}$ frame and an $(i+1)^{th}$ frame from the transmission terminal 110. The frame may include at least one data set that includes a source data segment and a parity data segment.

As a channel state between the reception terminal (for example, 120) and the transmission terminal 110 is changed, the reception terminal (for example, 120) may not receive some of data segments that constitute the $i^{th}$ frame, and thus may not restore the $i^{th}$ frame. Conversely, as the channel state improves, the reception terminal (for example, 120) may restore the $(i+1)^{th}$ frame from the received at least one data segment that constitutes the $(i+1)^{th}$ frame.

A data processing delay time that corresponds to an execution of a service may be previously determined in the reception terminal (for example, 120). For example, when a video streaming service is executed in the reception terminal (for example, 120), a delay time that corresponds to streaming video data may be previously determined.

The reception terminal (for example, 120) according to the present exemplary embodiment may determine whether to transmit a retransmission request for lost data segments of the $i^{th}$ frame to the transmission terminal 110, based on a data segment reception rate of the reception terminal (for example, 120) and a delay time allowance with respect to the reception terminal (for example, 120).

For example, referring to drawing (a) of FIG. 13, the reception terminal (for example, 120) may restore the first, second, fourth, fifth, and sixth frames but may not restore the third frame. The reception terminal (for example, 120) may determine whether it is possible to receive the data segment of the third frame within a delay time allowed in the reception terminal (for example, 120).

Referring to drawing (b) of FIG. 13, when it is determined that it is difficult to receive the data segment of the third frame within the delay time allowed in the reception terminal (for example, 120), the reception terminal (for example, 120) may remove the data segment of the third frame that has previously been received and stored in a buffer. Conversely, when it is determined that it is possible to receive the data segment of the third frame within the delay time allowed in the reception terminal (for example, 120), the reception terminal (for example, 120) may receive a retransmission request for sending the third frame to the transmission terminal 110.

Figure 14:
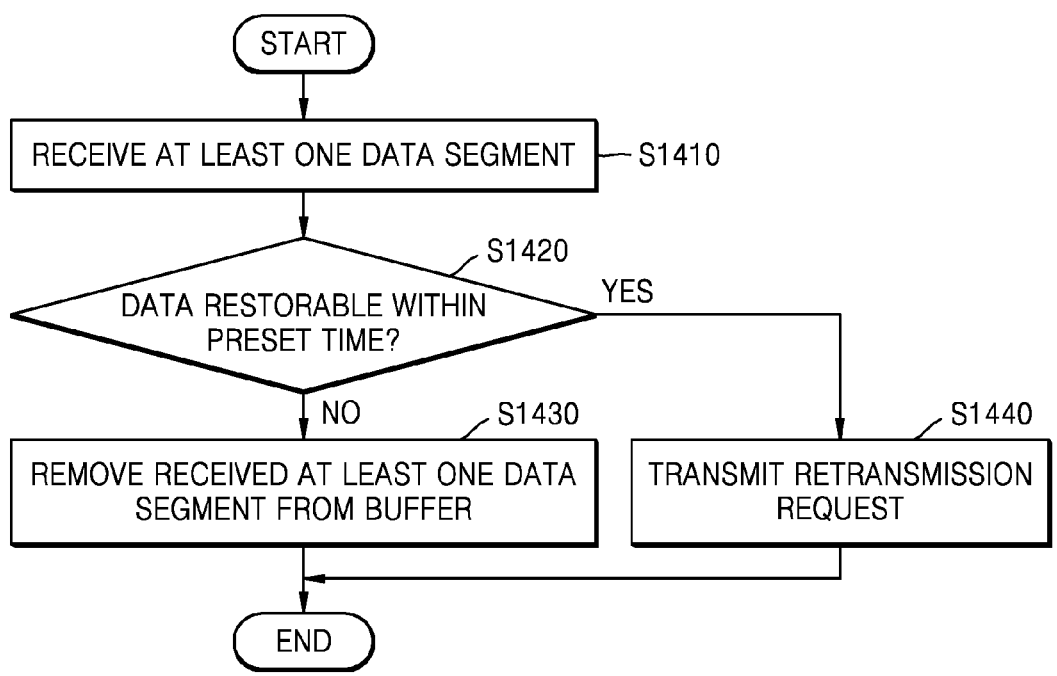
FIG. 14 is a flowchart of a method for transmitting a retransmission request for lost data segments, based on data received by a reception terminal, according to an exemplary embodiment.

FIG. 14 is a flowchart of a method for transmitting a retransmission request for lost data segments, based on data received by the reception terminal (for example, 120), according to an exemplary embodiment.

In operation S1410, the reception terminal (for example, 120) may receive, from the transmission terminal 110, at least one data segment selected from among first data that includes a source data segment and a parity data segment.

Operation S1410 may correspond to operation S910 described above with reference to FIG. 9.

In operation S1420, the reception terminal (for example, 120) may determine whether the first data is restorable within a preset time.

As a channel state between the reception terminal (for example, 120) and the transmission terminal 110 deteriorates, the reception terminal (for example, 120) may not receive some of data segments included in the first data and thus may not restore the first data. Conversely, as the channel state improves, the reception terminal (for example, 120) may restore second data from at least one data segment that constitutes the second data, which is received after at least one data segment of the first data has been received.

A data processing delay time that corresponds to an execution of a service may be previously determined in the reception terminal (for example, 120). The reception terminal (for example, 120) may receive the data segment of the first data in a previously determined delay time, based on a previously determined delay time and a data reception rate of the reception terminal (for example, 120), and thereby determine whether the first data is restorable.

In operation S1430, the reception terminal (for example, 120) may remove the received at least one data segment of the first data from the buffer.

When it is determined that it is difficult to receive the data segment of the first data within the delay time allowed in the reception terminal (for example, 120), the reception terminal (for example, 120) may remove the data segment of the first frame that has previously been received and stored in the buffer. The reception terminal (for example, 120) may increase a data processing speed by removing the data segment of the first data and restoring the second data, which was received after the first data was received.

In operation S1440, the reception terminal (for example, 120) may transmit a retransmission request for the data segment of the first data to the transmission terminal 110.

When it is determined that it is possible to receive the data segment of the first data within the delay time allowed in the reception terminal (for example, 120), the reception terminal (for example, 120) may transmit a retransmission request for the data segment of the first data to the transmission terminal 110.

Figure 15:
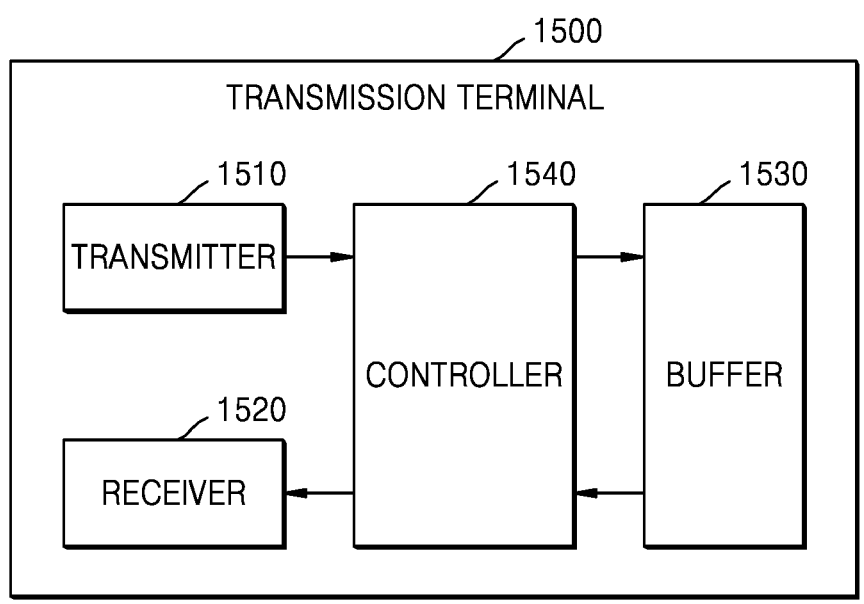
FIG. 15 is a block diagram of a transmission terminal, according to an exemplary embodiment.

FIG. 15 is a block diagram of a transmission terminal 1500, according to an exemplary embodiment.

The transmission terminal 1500 according to the present exemplary embodiment may include a transmitter 1510, a receiver 1520, a buffer 1530, and a controller 1540.

Only elements associated with the transmission terminal 1500 are illustrated in FIG. 15. Therefore, it will be understood by those of ordinary skill in the art that the transmission terminal 1500 may further include general-purpose elements, in addition to the elements illustrated in FIG. 15.

The transmission terminal 1500 of FIG. 15 may correspond to the transmission terminal 110 described above with reference to FIG. 1.

The transmitter 1510 may be configured to transmit data to the plurality of reception terminals 120, 130, and 140 by using a multicast scheme. The data may include a source data segment and a parity data segment which includes restoration information that relates to source data. A segment is a unit that represents data having a preset size. For example, the segment may include any of a data segment, a frame, or the like, but is not limited thereto.

The transmitter 1510 according to the present exemplary embodiment may be configured to transmit first data from among acquired data to each of the plurality of reception terminals 120 130, and 140.

The receiver 1520 may be configured to receive feedback information that relates to the first data from each of the plurality of reception terminals 120, 130, and 140. The feedback information may include information that relates to at least one selected from among a data loss rate, a data reception rate, and an RTT of the first data. The receiver 1520 may be further configured to receive a retransmission request for lost data segments from each of the plurality of reception terminals 120, 130, and 140.

The buffer 1530 may be configured to store at least one selected from among the data transmitted to the reception terminal (for example, 120) via the transmitter 1510 and the feedback information received via the receiver 1520. The buffer 1530 may be further configured to store information that relates to the retransmission request received from the reception terminal (for example, 120) via the receiver 1520.

The controller 1540 may be configured to predict a cause of data segment loss occurring in the reception terminal (for example, 120) based on the feedback information received from each of the plurality of reception terminals 120, 130, and 140. The cause of the data segment loss may include at least one selected from among an overflow of a buffer provided in the reception terminal (for example, 120) and a channel state with respect to the transmission terminal 1500 and the reception terminal (for example, 120).

The controller 1540 may be further configured to determine second data to be transmitted to the reception terminals 120, 130, and 140 after the first data has been transmitted, taking into consideration the predicted cause of the data segment loss. For example, the controller 1540 may determine the number of second parity data segments for restoring second source data included in the second data. According to another exemplary embodiment, the controller 1540 may determine a transmission rate of the second data.

According to another exemplary embodiment, the controller 1540 may determine whether to retransmit a first parity data segment for restoring a transmitted first source data segment, based on the feedback information received from each of the plurality of reception terminals 120, 130, and 140.

Figure 16:
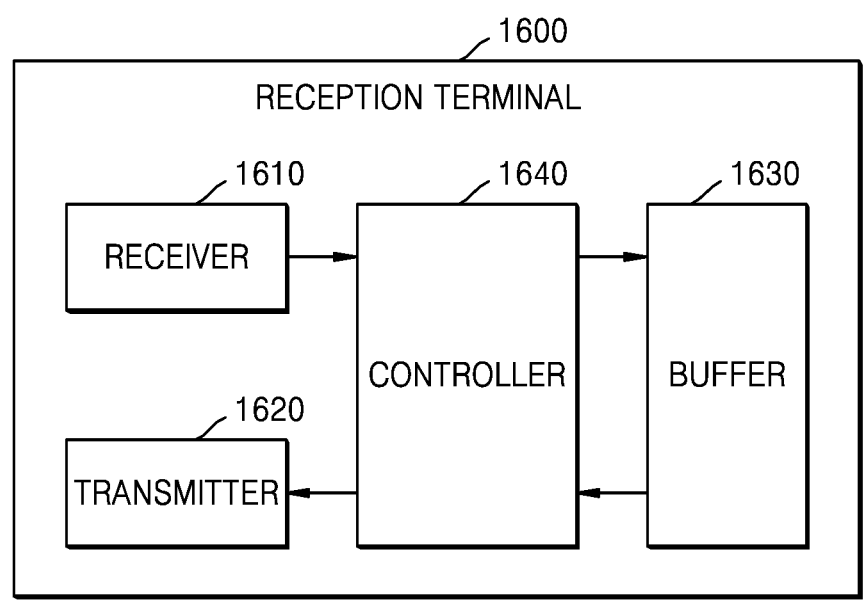
FIG. 16 is a block diagram of a reception terminal, according to an exemplary embodiment.

FIG. 16 is a block diagram of a reception terminal 1600, according to an exemplary embodiment.

The reception terminal 1600 according to the present exemplary embodiment may include a receiver 1610, a transmitter 1620, a buffer 1630, and a controller 1640.

Only elements associated with the reception terminal 1600 are illustrated in FIG. 16. Therefore, it will be understood by those of ordinary skill in the art that the reception terminal 1600 may further include general-purpose elements, in addition to the elements illustrated in FIG. 16.

The reception terminal 1600 of FIG. 16 may correspond to the reception terminal 120 described above with reference to FIG. 1.

The receiver 1610 may be configured to receive, from the transmission terminal 1500, at least one data segment selected from among first data that includes a source data segment and a parity data segment. The at least one data segment received via the receiver 1610 may be stored in the buffer 1630.

The transmitter 1620 may be configured to transmit feedback information that relates to the first data to the transmission terminal 1500. The feedback information may be generated by the controller 1640.

The controller 1640 may be configured to determine a time point at which the generated feedback information is to be transmitted to the transmission terminal 1500, via the probing message received from the transmission terminal 1500. The probing message may include information that relates to at least one selected from among a data loss rate, a data reception rate, and an RTT of each of the plurality of reception terminals connected to the transmission terminal 1500. The probing message may be transmitted from the transmission terminal 1500 to each of the plurality of reception terminals according to a preset period.

According to another exemplary embodiment, the receiver 1610 may receive at least one segment included in the first data and at least one segment included in the second data from the transmission terminal 1500. The second data represents data that is transmitted from the transmission terminal 1500 after the first data has been transmitted.

Due to data loss, the controller 1540 may not be able to restore the first source data segment from the received at least one segment of the first data. Further, when the controller 1540 cannot restore the second source data segment from the subsequently received at least one segment of the second data, the reception terminal 120 may predict a time point at which the first parity data segment of the first source data segment is to be received and determine whether to request a retransmission of the first parity data segment.

For example, when the controller 1540 predicts that the first parity data segment will not be received within a preset time, the controller 1540 may perform a higher-level process so that the second source data segment is preferentially executed. The high-level process may include a process in an application layer or the like. According to another exemplary embodiment, when the controller 1540 predicts that the first parity data segment will be received within the preset time, the controller 1540 may send a request to the transmission terminal 1500 for the first parity data segment.

The terminals according to the present exemplary embodiments may include a processor, a memory configured to store and execute program data, a permanent storage such as a disk drive, a communication port configured to handle communications with external devices, and user interface devices, including any one or more of a touch panel, keys, buttons, etc. The methods implemented by software modules or algorithms may be stored as program instructions or computer-readable codes executable on the processor or a non-transitory computer-readable medium. Examples of the non-transitory computer-readable medium may include magnetic storage media (e.g., read-only memory (ROM), random-access memory (RAM), a floppy disk, a hard disk, etc.), and optical readable media (e.g., CD-ROM, digital versatile disc (DVD), etc.). The non-transitory computer-readable recording medium may also be distributed over network-coupled computer systems so that the non-transitory computer-readable code is stored and executed in a distributed fashion. This media may be read by the computer, be stored in the memory, and be executed by the processor.

All documents cited in the specification, including published documents, patent applications, and patents, may be incorporated herein in their entirety by reference in the same manner as when each cited document is separately and specifically incorporated or incorporated in its entirety.

For the purposes of promoting an understanding of the exemplary embodiments, reference numerals have been assigned to the exemplary embodiments illustrated in the drawings, and specific terms have been used to describe these exemplary embodiments. However, no limitation of the scope of the exemplary embodiments is intended by these specific terms, and the exemplary embodiments should be construed to encompass all embodiments that would normally occur to one of ordinary skill in the art.

The exemplary embodiments may be described in terms of functional block components and various processing operations. Such functional blocks may be realized by any number of hardware and/or software components configured to perform the specified functions. For example, the exemplary embodiments may employ various integrated circuit components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements, the exemplary embodiments may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the exemplary embodiments could employ any number of conventional techniques for electronics configuration, signal processing and/or control, data processing and the like. The terms "mechanism" and "element" are used in a broad sense and are not limited to mechanical or physical embodiments, but may include software routines in conjunction with processors, or the like.

The particular implementations shown and described herein are illustrative examples of the exemplary embodiments and are not intended to otherwise limit the scope of the present inventive concept in any way. For the sake of brevity, conventional electronics, control systems, software, and other functional aspects of the systems may not be described in detail. Furthermore, the connecting lines or connecting members shown in the various figures are intended to represent functional relationships and/or physical or logical connections between the various elements. It should be noted that many alternative or additional functional relationships, physical connections or logical connections may be present in a practical apparatus. Moreover, no component is essential to the practice of the exemplary embodiments unless the element is specifically described as "essential" or "critical".

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method for transmitting and receiving data, which is performed by a terminal, the method comprising:
   transmitting first data to each of a plurality of reception terminals that are connected to the terminal, the first data including at least one source data segment and at least one first parity data segment;
   determining a number of a second parity data segment required for restoring source data included in second data to be transmitted after the first data has been transmitted, based on a data loss rate determined according to feedback information that relates to the first data and is received from each of the plurality of reception terminals; and
   transmitting the second data to each of the plurality of reception terminals.

2. The method of claim 1, wherein the transmitting the first data comprises transmitting the first data using a multicast scheme that includes at least one from among a protocol that includes requesting feedback whenever data is received, a protocol that includes requesting feedback whenever a data loss is detected, and a protocol that includes using a coding algorithm for restoring lost data.

3. The method of claim 1, wherein the feedback information includes at least one from among information that relates to the data loss rate, information that relates to a data reception rate, and information that relates to a round trip time of the first data.

4. The method of claim 1, wherein the determining the number of the second parity data segment required for restoring the source data included in the second data comprises determining a cause of data segment loss based on the feedback information, and determining the number of the second parity data segment required for restoring the source data included in the second data based on the determined cause of the data segment loss.

5. The method of claim 4, wherein the determined cause of the data segment loss includes at least one from among i) an overflow of a buffer provided in at least one from among the plurality of reception terminals and ii) a channel state with respect to the terminal and the at least one from among the plurality of reception terminals.

6. The method of claim 1, wherein the determining the number of the second parity data segment required for restoring the source data included in the second data comprises determining a minimum number of parity segments.

7. The method of claim 1, further comprising determining a transmission rate for the transmitting the second data.

8. The method of claim 1, further comprising determining, based on the received feedback information, whether to retransmit at least one data segment from among the at least one source data segment and the at least one first parity data segment included in the first data.

9. The method of claim 8, further comprising, when the received feedback information includes an indication that a subsequent parity data segment with respect to a lost parity data segment has been received, determining to not retransmit the lost parity data segment.

10. The method of claim 1, wherein the determining the number of the second parity data segment required for restoring the source data included in the second data comprises increasing a number of source data segments to be included in the second data when the feedback information includes information that indicates that no loss of data has occurred.

11. A non-transitory computer-readable recording medium that stores a program which, when executed by a processor, performs the method for transmitting and receiving data recited in claim 1.

12. A terminal comprising:
   a transmitter configured to transmit first data to each of a plurality of destination terminals that are connected to the terminal via a network, the first data including at least one source data segment and at least one first parity data segment;

a receiver configured to receive, from each of the plurality of destination terminals, feedback information that relates to the first data; and a controller configured to determine a number of a second parity data segment required for restoring source data included in second data to be transmitted after the first data has been transmitted, based on a data loss rate determined according to the received feedback information, and to control the transmitter to transmit the second data to each of the plurality of destination terminals.

13. The terminal of claim 12, wherein the transmitter is further configured to transmit the first data by using a multicast scheme that includes at least one from among a protocol that includes requesting feedback whenever data is received, a protocol that includes requesting feedback whenever a data loss is detected, and a protocol that includes using a coding algorithm for restoring lost data.

14. The terminal of claim 12, wherein the feedback information includes at least one from among information that relates to the data loss rate, information that relates to a data reception rate, and information that relates to a round trip time of the first data.

15. The terminal of claim 12, wherein the controller is further configured to determine a cause of data segment loss based on the feedback information, and to determine the number of the second parity data segment required for restoring the source data included in the second data based at least in part on the determined cause of the data segment loss.

16. The terminal of claim 15, wherein the determined cause of the data segment loss includes i) at least one from among an overflow of a buffer provided in at least one from among the plurality of destination terminals and ii) a channel state with respect to the terminal and the at least one from among the plurality of destination terminals.

17. The terminal of claim 12, wherein the controller is further configured to determine a minimum number of parity segments.

18. The terminal of claim 12, wherein the controller is further configured to determine a transmission rate for the transmission of the second data.

19. The terminal of claim 12, wherein the controller is further configured to determine, based on the received feedback information, whether to retransmit at least one data segment from among the at least one source data segment and the at least one first parity data segment included in the first data.

20. The terminal of claim 19, wherein the controller is further configured to, when the received feedback information includes an indication that a subsequent parity data segment with respect to a lost parity data segment has been received, determine to not retransmit the lost parity data segment.

* * * * *